United States Patent

Rasmussen

[15] 3,707,272

[45] Dec. 26, 1972

[54] CUP HOLDER FOR AUTOMOBILES

[72] Inventor: Lester M. Rasmussen, 611 N. Ash Street, Momence, Ill. 60954

[22] Filed: May 19, 1970

[21] Appl. No.: 38,746

[52] U.S. Cl..................................248/311, 211/75
[51] Int. Cl.............................................A47c 7/70
[58] Field of Search......248/309, 311, 314, 315, 215, 248/210, 211, 216; 211/71, 74, 75, 76, 88, 106; 108/46; 224/42.45

[56] References Cited

UNITED STATES PATENTS

| 424,651 | 4/1890 | Long | 248/311 X |
| 577,528 | 2/1897 | Kachler | 211/88 |
| 1,782,962 | 11/1930 | Hobbs | 248/313 X |
| 3,031,162 | 4/1962 | Whorton | 248/311 X |
| 3,193,232 | 7/1965 | Hatcher | 248/311 X |

FOREIGN PATENTS OR APPLICATIONS

| 319,304 | 11/1902 | France | 248/311 |
| 196,720 | 8/1957 | Germany | 224/2.45 |

Primary Examiner—J. Franklin Foss
Attorney—Curtis F. Prangley, Mark H. Clayton, Edward U. Dithmar, David A. Vogel, Ronald A. Sandler, Harold V. Stotland and J. Terry Stratman

[57] ABSTRACT

A cup holder is provided with clip and brace means for detachably securing same to the inside of an automobile door to hold any food dispensed in cups. Auxiliary clips detachably secured to the holder can be used to support bags holding additional food or refuse as well as holding napkins and the like.

8 Claims, 3 Drawing Figures

PATENTED DEC 26 1972
3,707,272
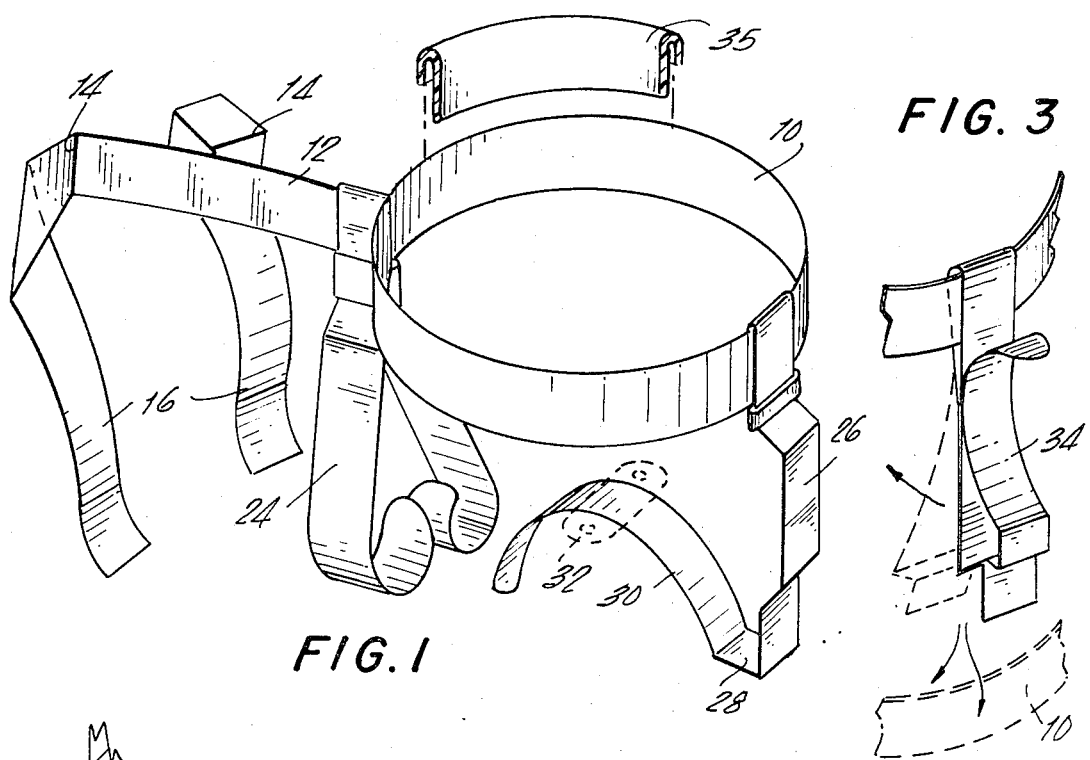
FIG. 3
FIG. 1
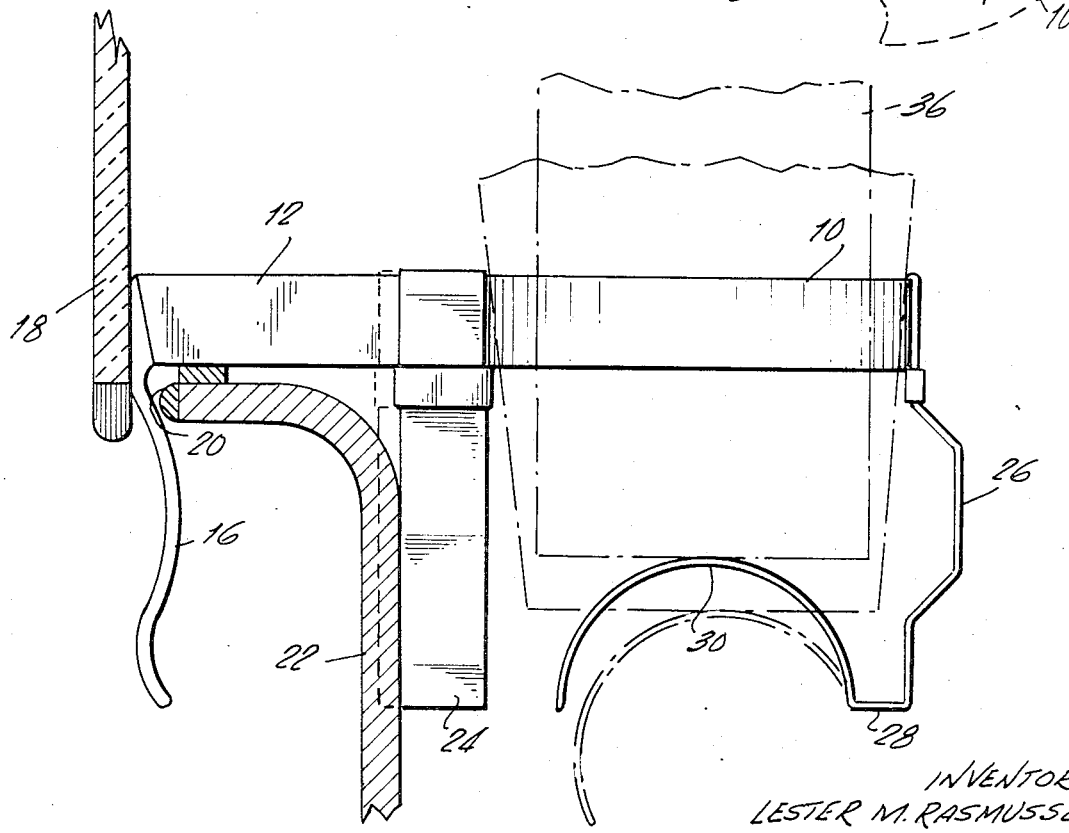
FIG. 2
INVENTOR.
LESTER M. RASMUSSEN

CUP HOLDER FOR AUTOMOBILES

SUMMARY OF THE INVENTION

My invention, which I call a "CLIP. O. CUP" employs a horizontally disposed ring from which a horizontal V-shaped member extends, each of the two outer ends of the member having prongs or arms which can be inserted into the inner window ledge of the door of an automobile to hold the ring for use in detachably supporting a food carrying cup. A brace secured to the member at the region where member and ring join extends downward to bear against the inner surface of the door and provide support and rigidity to the holder. An arch bottom is secured to a center portion of the ring and extends downward and under the ring to provide support at the bottom of any cup in the holder. The arch bottom is adjustable to accommodate different depths and sizes of cups.

Additional detachable means can be used to hold bags, napkins or the like.

BRIEF DESCRIPTION OF THE DRAWINGS

In the drawings:

FIG. 1 is a perspective view of my holder;

FIG. 2 is a side view thereof as shown in use; and

FIG. 3 is a detail view of an accessory for use with the holder of FIGS. 1 and 2.

DETAILED DESCRIPTION OF PREFERRED EMBODIMENTS

Referring now to FIGS. 1-3, a horizontal ring 10 formed from a metal strap or the like has a pair of mounting arms 12 of spring steel flat strip or the like connected thereto and extending horizontally outwardly therefrom and terminating in outer ends 14. The arms 12 lie generally in vertical planes, the inner connected ends of the arms 12 being disposed generally in horizontal alignment with each other and resiliently biased apart so that the outer ends 14 thereof are spaced from each other. Integral with each of the arms 12 at the outer ends 14 thereof and extending downwardly therefrom is a prong 16 adapted to fit detachably between the window 18 and the inner ledge 20 of an automobile door panel 22. A generally heart shaped brace 24 also of strap metal is secured to and hangs downward from the arms 12 adjacent the ring to bear against the inner surface of the door and provide additional rigidity and support to the door. More particularly, the brace 24 is formed of a continuous strip of spring steel and is looped over the arms 12 adjacent to the ring 10, the brace 24 being slidably movable along the arms 12 longitudinally thereof, as indicated by the dotted lines in FIG. 2. Thus, when the prongs 16 are inserted between the window 18 and ledge 20, the brace 24 may be slid into engagement with the inner surface of the door panel 22, whereby it will be appreciated that door panels and ledges of different widths or thicknesses may be accommodated between the prongs 16 and the brace 24. Arch bottom means includes a vertical arm 26 secured to the ring and extending downward, the bottom of arm 26 being connected by horizontal extension 28 to one end of a U-shaped member 30 disposed inverted in a vertical plane underneath the holder. In use a cup 36 (indicated in broken lines in FIG. 2) of food such as liquids of any type or solids of any type is inserted in the ring. Member 30 is then bent or flexed into a suitable cup bottom support position which depends upon the depth and shape of the cup. Member 30 can have an arm 32 thereon for additional support.

There may also be provided a soft plastic liner 35 for the ring 10, the liner 36 being generally J-shaped in transverse cross section as illustrated in FIG. 1, and being receivable over the upper edge of the ring 10 to provide a padding therefor.

One or more auxiliary clips 34 can be detachably secured to the ring and extend downward to hold bags, for example of food or for refuse, or napkins or the like.

While I have described my invention with particular reference to the drawings, such is not to be considered as limiting its actual scope.

Having thus described this invention, what is asserted as new is:

1. A carrier for a cup or the like adapted to be detachably mounted on an automobile door, said carrier comprising a retaining ring disposed in use substantially horizontally for receiving coaxially therethrough an associated cup in an upstanding condition, mounting means coupled to said ring and extending outwardly therefrom for detachably mounting said ring on the associated door, an annular liner substantially U-shaped in transverse cross section and adapted to be removably received on said retaining ring for covering the upper circumferential edge thereof to provide a padding therefor, a discrete hanger coupled to said ring and extending substantially vertically downwardly therefrom, and an arcuate base member connected to said hanger adjacent to the lower end thereof and having a free distal end extending inwardly beneath said ring, said base member being curved upwardly from said hanger to form an arch disposed for supporting engagement with the bottom of an associated cup disposed within said retaining ring to provide the sole bottom support therefor, said base member being formed of flexible and resilient material and being shiftable among a plurality of different configurations for accommodating associated cups of various sizes, whereby said base member and said ring cooperate to support the associated cup in an upstanding condition.

2. A carrier for a cup or the like adapted to be detachably mounted on an automobile door having a door panel and a window disposed on one side of the panel and spaced a predetermined distance therefrom, said carrier comprising a receptacle disposed in use for receiving and supporting therein an associated cup in an upstanding condition, a pair of mounting arms each having an inner end coupled to said receptacle and an outer end disposed away from said receptacle, said arms being disposed in use substantially horizontally with the inner ends thereof being disposed closely adjacent to each other and with the outer ends thereof being resiliently biased away from each other, a pair of prongs respectively connected to said arms adjacent to the outer ends thereof and extending downwardly therefrom, said carrier having a mounted configuration with said arms overlying the associated door panel and with said prongs inserted downwardly between the associated window and the one side of the associated door panel and with said receptacle disposed on the opposite side of the associated door panel, whereby said arms and said prongs cooperate for engagement with the associated window and door panel for mounting said receptacle thereon to support the associated cup.

3. The carrier set forth in claim 2 wherein each of said mounting arms is constructed of spring steel.

4. The carrier set forth in claim 2 wherein each of said prongs is formed of a flexible and resilient material, said prongs being formed so as to simultaneously engage both the associated window and the associated door panel when said carrier is disposed in the mounted figuration thereof.

5. A carrier for a cup or the like adapted to be detachably mounted on an automobile door having a door panel and a window disposed on one side of the panel and spaced a predetermined distance therefrom, said carrier comprising a receptacle disposed in use for receiving and supporting therein an associated cup in an upstanding condition, a pair of mounting arms disposed in use substantially horizontally and each having an inner end coupled to said receptacle and a free distal end disposed away from said receptacle, two prongs respectively connected to said arms adjacent to the distal ends thereof and extending downwardly therefrom, and a brace member coupled to said arms intermediate the ends thereof and extending downwardly therefrom and being movable longitudinally with respect thereto for varying the spacing between said brace member and said prongs, said carrier having a mounted configuration with said arms overlying the associated door panel and with said prongs inserted downwardly between the window and the one side of the associated door panel and with said receptacle disposed on the opposite side of the associated door panel, said brace member being movable into engagement with the opposite side of the associated door panel for cooperation with said prongs to accommodate the associated door panel therebetween, whereby said carrier may be firmly mounted on automobile doors having panels of varying thickness by appropriate adjustment of the position of said movable brace member.

6. The carrier set forth in claim 5 wherein said receptacle is constructed of a steel band.

7. The carrier set forth in claim 5 wherein said brace is formed of a continuous strip of steel looped over and engaging said mounting arms for urging said arms together adjacent to the area of engagement therewith, the free ends of said strip extending downwardly from said mounting arms.

8. A carrier for a cup or the like adapted to be detachably mounted on an automobile door having a door panel and a window disposed on one side of the panel and spaced a predetermined distance therefrom, said carrier comprising a retaining ring disposed in use substantially horizontally for receiving coaxially therethrough an associated cup in an upstanding condition, a pair of mounting arms each having an inner end coupled to said ring and an outer end disposed away from said ring, said arms being disposed in use substantially horizontally with the inner ends thereof being disposed closely adjacent to each other and with the outer ends thereof being resiliently biased away from each other, a pair of prongs respectively connected to said arms adjacent to the outer ends thereof and extending downwardly therefrom, a brace member coupled to said arms intermediate the ends thereof and extending downwardly therefrom and being movable longitudinally with respect thereto for varying the space between said brace member and said prongs, a discrete hanger coupled to said ring and extending substantially vertically downwardly therefrom, and an arcuate base member connected to said hanger adjacent to the lower end thereof and having a free distal end extending inwardly beneath said ring, said base member being curved upwardly from said hanger to form an arch disposed for supporting engagement with the bottom of an associated cup disposed within said retaining ring, said carrier having a mounted configuration with said arms overlying the associated door panel and with said prongs inserted downwardly between the associated window and the one side of the associated door panel and with said ring disposed on the opposite side of the associated door panel, said brace member being movable into engagement with the opposite side of the associated door panel for cooperation with such prongs to accommodate the associated door panel therebetween, whereby said carrier may be firmly mounted on automobile doors having panels of varying thickness by proper adjustment of the position of said movable brace member with said brace member and said ring cooperating to support the associated cup in an upstanding condition.

* * * * *